United States Patent [19]
Kutch et al.

[11] 3,932,341
[45] Jan. 13, 1976

[54] HOT MELT SEALANTS, ADHESIVES AND THE LIKE

[75] Inventors: Edward F. Kutch, Trenton, N.J.; Robert M. Meyers, Fairless Hills, Pa.; Matthew M. Sitter, Convent Station, N.J.

[73] Assignee: Novagard Corporation, Trenton, N.J.

[22] Filed: Apr. 12, 1974

[21] Appl. No.: 460,332

Related U.S. Application Data

[63] Continuation of Ser. No. 256,928, May 25, 1972, abandoned.

[52] U.S. Cl. ............... 260/33.6; 260/27; 260/28; 260/28.5 AS; 260/30.6 R; 260/31.8 DR; 260/31.8 M; 260/31.2 MR; 260/33.8 UA
[51] Int. Cl.² ... C08K 5/01; C08K 5/12; C08K 5/52; C08L 95/00
[58] Field of Search ............. 260/28.5 AS, 33.6 AQ, 31.8 DR, 260/31.8 M, 31.2 MR, 27 BB

[56] References Cited
UNITED STATES PATENTS

| | | | |
|---|---|---|---|
| 2,551,600 | 5/1951 | Holland | 260/27 BB |
| 2,864,882 | 12/1958 | Snell | 260/27 BB |
| 3,444,117 | 5/1969 | Higgins | 260/28.5 |
| 3,478,475 | 11/1969 | Strack | 260/33.6 AQ |
| 3,484,405 | 12/1969 | Seto | 260/33.6 AQ |
| 3,500,603 | 3/1970 | Strack | 260/33.6 AQ |
| 3,647,745 | 3/1972 | Jennings | 260/45.7 P |
| 3,674,735 | 7/1972 | Callan | 260/33.6 AQ |
| 3,767,608 | 10/1973 | Hand | 260/28.5 AS |

Primary Examiner—Paul R. Michl
Attorney, Agent, or Firm—Sperry and Zoda

[57] ABSTRACT

Solvent-free hot melt compositions for use as sealants, adhesives, caulking compounds or the like are produced by intimately blending elastomeric polymers with tackifying resins and plasticizers to obtain products having a hardness at room temperature of at least about 5 on the Shore A Durometer scale while being sufficiently soft at temperatures of about 50°F or higher to permit them to be easily extruded or otherwise applied. Adhesion promoters, lubricants, fillers and the like are preferably added to the composition to improve the properties thereof. The products are characterized by their stability over a wide range of temperatures, their resistance to oxidation and weathering, and their low moisture vapor transmission properites.

5 Claims, No Drawings

HOT MELT SEALANTS, ADHESIVES AND THE LIKE

This application is a continuation of copending application Ser. No. 256,928 filed May 25, 1972 now abandoned.

FIELD OF INVENTION

Many types of adhesives, sealants, caulking compositions and the like have been developed heretofore and are discussed at length in the book entitled "Sealants" by Adolfos Damusis published in 1967 by Reinhold Publishing Company. However, such compositions generally contail substantial amounts of volatile solvents which are often toxic or flammable and in any event are gradually released from the material resulting in delays in the operations in which they are employed and shrinkage of the material which is objectionable in many situations. Certain compositions of this type also contain curing or vulcanizing agents which interact to change the properties of the material over extended periods of time and do not lend themselves to rapid manufacturing operations.

Hot melt compositions are generally free of such objections in that they are soft or fluid at elevated temperatures but harden upon cooling without thereafter undergoing material change in volume or chemical or physical properties. While many of the polymers used in solvent and reaction type adhesives and sealants possess desirable properties, such as elasticity and moisture resistance, they have not been capable of use in hot melt compositions heretofore for the reason that they are not generally thermoplastic or workable in the absence of solvents or do not possess their desired properties until vulcanization or curing of the constituents thereof has taken place. Moreover, they do not possess adequate adhesive properties for many uses when in contact with glass and other substrates without the use of a priming coat first applied to such surfaces by a further operation. See for example, U.S. Pat. Nos. 2,903,437; 3,027,337; 3,340,224; and 3,553,913.

In accordance with the present invention a wide variety of hot melt compositions adapted for use as adhesives, sealants, caulking compositions, expansion joints and the like are provided which are sufficiently soft or fluid at a temperature above about 150°F to permit them to be readily applied in use and which harden upon cooling without solvent release or chemical reaction between constituents thereof.

These advantages are attained by provided compositions which in general consist of intimate mixtures of elastomeric polymers having a molecular weight of at least about 15,000 with plasticizing agents and tackifying resins. In most compositions adhesion promoters, lubricants and fillers are added to improve the properties of the hot melt compositions.

The hardness of the compositions at room temperature may vary from about 5 to 95 on a Shore A Durometer depending upon its formulation and the use for which the product is intended whereas they are all sufficiently soft at temperatures of about 150°F to 375°F to permit them to be readily applied by conventional equipment such as a heated caulking gun or the like.

Typical compositions embodying the present invention contain from about 10 to 100 parts by weight of one or more solid elastomeric polymers having a molecular weight of from about 15,000 up to 200,000 or 300,000 or more. Among such polymers and the trade names by which they are sometimes identified are, butyl rubbers such as the copolymers of isobutylene and isoprene (Ex 214 and PB201) polyisobutylene having a high molecular weight in the range below about 150,000 (Vistonex MML140); butadienestyrene (Buna-S) and styrene-butadienestyrene polymers (GRS and Kraton SBS).

The elastomeric polymers are intimately blended with tackifying resins and plasticizers in varying amounts depending upon the purpose for which the hot melt is to be employed. The amount of tackifying resins may range from about 1 to 400 parts for each 100 parts by weight of the elastomeric polymer employed whereas the amount of the plasticizer used may vary from about 15 to 600 parts to each 100 parts by weight of the elastomer used.

Among the tackifying resins preferred are terpene resins (Piccohesive 125); polyterpene resins (Wing Tack 95 and Foral 105); phenolic resins (SP559 and Super Beckocite 2000); hydrogenated rosin (Stabilite ester 10); and hydrocarbon resins (Nevillac 10 and ERJ 683). Typical plasticizers are polybutenes (Indopol 1900 and H-100); polyisobutylenes having a low molecular weight not exceeding about 10,000 (Vistonex LMMS); phosphate esters (Santicizer 148); dibutyl phthalate; plasticizers low temperature plasticizers such as straight chain aliphatic acid esters TP90B, TP95, ZP 680, parafine oils (Sun Par 2100); coal tars and asphalts. Chlorinated polyphenyl (Aroclor 5460) and chlorinated biphenyl (Aroclor 1254) may be used for both their tackifying and plasticizing properties.

Adhesion promoters are incorporated in most compositions in amounts ranging from 0.5 to 60 parts by weight for each 100 parts by weight of the elastomer and are preferably selected from the group consisting of epoxy resins, organic silanes and mixtures thereof and urethane polyesters and polyethers. Typical adhesion promoters are epoxy resins having an epoxide equivalent of from 150 to 3000 such as the resins sold by Shell Chemical Company under the names Epon 1002 and 828. Among the organic silanes employed are those sold by Union Carbide Corporation which are vinyl, cyclic epoxy, aliphatic epoxy and methacryloxy silanes identified as A-186, A-187, A-153 and A-151. Other adhesion promoters which may be used are urethane polyesters and polyethers such as Solthane 291 and Guardthane 72, ethylene vinyl acetate sold by Union Carbide under the designation EVA and the phenolic resin known as Methylon 75108.

While certain of the constituents of the composition as herein described are referred to as "tackifyers", "plasticizers" and "adhesion promoters", some of these agents are poly-functional in that they possess both tackifying and plasticizing or other properties or may improve the action of other agents in the composition by reason of their use in combination. Thus for example, the terpene resins often serve as plasticizers or improve the action of other plasticizers used in the mixture.

In most compositions it is desirable to use epoxy resin as the principal adhesion promoter but mixtures of epoxy resins with an organic silane often are found to be more effective, particularly when the hot melt composition is to be used in contact with glass. They serve in combination to improve the cohesive strength of the material. The silanes are particularly useful when the hot melt is applied to glass since it is then unnecessary to apply a priming layer to the glass prior to application of the hot melt. However, when a silane compound is used in combination with an epoxy resin, the compounds selected should be chosen so as to avoid chemical reaction therebetween. Thus amino silanes are not generally adapted for use in combination with epoxy resins in compositions of the present invention.

Furthermore the use of epoxy resins in combination with the organic silanes improves the resistance to the action of water and ultra-violet light so as to increase its life and continued adhesion properties under adverse weather conditions.

From 5 to 1000 parts by weight of fillers based on each 100 parts of the elastomeric polymer may be used in producing the hot melt compositions of the present invention. Typical of such fillers are carbon blacks; calcium carbonate, talc, titanium, dioxide, asbestos filbers, clay, silica, wood flour and the like.

In producing the compositions the constituents are intimately mixed and blended in a mill such as a Baker-Perkins Sigma Blade Mixer. Ordinarily the elastomer and tackifying resin are introduced first and when well blended the adhesion promoter and at least part of the filler is added and the plasticizer then introduced as the mixing operation is continued. The blending is effected by the shearing action of the mill and generally is carried out for about 30 to 60 minutes during which time the temperature rises to about 100° to 140°F, and preferably is kept below about 250°F. No chemical reaction takes place between the constituents of the composition during mixing thereof. The product is instead a simple, mechanical mixture of the ingredients.

The proportions and selection of the elastomers, tackifyers, plasticizers and other ingredients employed can be varied depending on the particular properties desired in producing hot melt adhesives for use in the manufacture of shoes, box board, plywood, metal clad sheets and laminates, modular home, truck bodies, and motor vehicle parts, wall panelling and building elements. In addition, the compositions may also be compounded for use as caulking materials, expansion joints for roads, bridges and buildings, sealants for window and structural joints, back bedding for windows and for other purposes.

The following compositions are typical of those adhesives adapted for use in the manufacture of shoes, box board, and the like. The proportions given are in parts by weight:

| Composition | 1 | 2 | 3 |
|---|---|---|---|
| Rubber (EX 214) | 25 | 10 | 25 |
| Tackifier (Wing Tack 95) | 75 | 90 | 75 |
| Plasticizer (Indopol 1900) | 25 | 25 | 20 |
| Plasticizer (Indopol 100) | 20 | 20 | — |
| Adhesion Promoter (Epon 1007) | 20 | 20 | 10 |
| Filler (CaCo₃) | 40 | 40 | — |

These adhesives are soft at temperatures of 250°F and can be applied readily with conventional equipment but have a hardness of from 20 to 90 on the Shore A Durometer at room temperature.

The following adhesives are better adapted for use in building comstructions, laminates and the production of metal clad sheets.

| Composition | 4 | 5 | 6 | 7 |
|---|---|---|---|---|
| EX 214 | 100 | 100 | 100 | 100 |
| Super Beckocite | — | 25 | — | — |
| Epon 1004 | 20 | 30 | 20 | 20 |
| Silane A 186 | 2 | — | — | — |
| Aroclor 5460 | 25 | — | — | — |
| Stearic Acid | 2 | 2 | 2 | 2 |
| Camel Carb | 50 | 75 | — | — |
| CaCO₃ | 75 | 100 | — | — |
| Carbon Black | 10 | 10 | — | — |
| Indopol H 100 | 40 | 50 | — | — |
| Indopol 1900 | 60 | 100 | — | — |
| Asbestos 114 | 2 | 2 | — | — |
| Sun Par 2100 | — | — | 50 | 100 |
| Statex RH | — | — | 80 | 100 |
| Hardness (Shore A) | 40 | 45 | 36 | 32 |

These adhesives are somewhat more elastic and flexible that the compositions 1, 2 and 3 above and while relatively fluid at temperatures of 300°F for easy application they harden at room temperature. They adhere tenaciously to glass, aluminum and other sheet material and impart structural strength to building elements.

Compositions designed for use as caulking compoinds, sealants for buildings, windows and other assemblies are exemplified by the following:

| Composition | 8 | 9 |
|---|---|---|
| EX 214 | 100 | 100 |
| Indopol 1900 | 50 | 50 |
| Indopol 100 | 75 | — |
| CaCO₃ | 400 | 80 |
| Asbestos 144 | 200 | — |
| Epon 1007 | 20 | 40 |
| Silane A 186 | 2 | — |
| Wing Tack 95 | — | 100 |
| Hardness (Shore A) | 15–50 | 28 |

Other sealants embodying the present invention are as follows:

| Composition | 10 | 11 | 12 | 13 | 14 | 15 | 16 | 17 | 18 |
|---|---|---|---|---|---|---|---|---|---|
| EX 214 | 50 | 50 | 50 | 50 | 50 | 50 | 50 | 50 | 50 |
| Wing Tack 95 | 50 | 50 | 50 | 50 | 50 | 50 | 50 | 50 | 50 |
| CaCO₃ | 40 | 40 | 40 | 40 | 40 | 40 | 40 | 40 | 40 |
| Epon 1007 | — | 20 | — | 10 | 20 | — | — | — | — |
| Silane A 186 | — | — | 2.0 | 1.0 | 2.0 | — | — | — | — |
| Methylon 75108 | — | — | — | — | — | 5 | 10 | — | — |
| Ethyl Acrylic Acid | — | — | — | — | — | — | — | 10 | 25 |
| Stearic Acid | 1.0 | 1.0 | 1.0 | 1.0 | 1.0 | 1.0 | 1.0 | 1.0 | 1 |
| Indopol 1900 | 25 | 25 | 25 | 25 | 25 | 25 | 25 | 25 | 25 |
| Hardness (Shore A) | 28 | 34 | 35 | 30 | 32 | 23 | 37 | 34 | 45 |

Compositions in the form of ductile materials for back bedding in mounting windows and the like are represented by the following:

| Composition | 23 | 24 |
| --- | --- | --- |
| EX 214 | 50 | 50 |
| Wing Tack 95 | 25 | — |
| Super Beckocite 2000 | — | 25 |
| Indopol H-100 | 50 | — |
| Sun Par 2100 | — | 50 |
| CaCO₃ | 60 | — |
| Carbon Black | 10 | — |
| Epon 1007 | 20 | — |
| Statex RH | — | 70 |
| Stearic Acid | 1 | 1 |
| Hardness (Shore A) | 35 | 40 |

These products are all soft and flowable at temperatures above 250°F and adhere tenaciously to glass, aluminum and the like.

The following composition is particularly adapted for use in expansion joints for roads, airport runways, bridges, sidewalks and elsewhere.

| Composition | 25 |
| --- | --- |
| EX 214 | 50 |
| Asphalt | 50 |
| CaCO₃ | 50 |
| Carbon Black | 25 |
| Wing Tack 95 | 15 |
| Epon 1004 | 20 |
| Hardness (Shore A) | 27 |

Another expansion joint composition is exemplified by the following:

| Composition | 26 |
| --- | --- |
| EX 214 | 75 |
| Aroclor 5460 | 25 |
| Stearic Acid | 1.5 |
| Epon 1007 | 20 |
| Silane 186 | 1.0 |
| Carbon Black | 75 |
| Indopol 1900 | 40 |
| Indopol 100 | 30 |
| Hardness (Shore A) | 32 |

All of the products described above are characterized by the fact that they are solvent-free and do not rely upon chemical reactions to cure or vulcanize the rubber or other elastomers of the blend. As a result they do not undergo shrinkage or material change in physical properties after cooling to room temperature following application. Moreover, they are easy and economical to produce and easy to handle using conventional equipment without delay or danger of fire or the need for special ventilation in the areas where they are employed.

It will be apparent from the foregoing discussion and discussion and examples cited, that compositions embodying the present invention are capable of many modifications depending upon the particular attributes and physical properties desired for the various uses and applications of the hot melt compositions. In view thereof it should be understood that the particular embodiments and formulations of the products cited are intended to be illustrative only and are not intended to limit the scope of the invention.

We claim:

1. Solvent free hot-melt compositions adapted to be extruded as sealants, adhesives, caulking compounds, expansion joints and the like consisting essentially of an unreacted mechanical mixture of 100 parts by weight of polymerized elastomeric butyl rubber composed essentially of a copolymer of isobutylene and isoprene having a molecular weight above about 15,000; with from 1 to 400 parts by weight of tackifying resin selected from the group consisting of terpene resins, polyterpene resins, phenolic resins, hydrogenated rosin, hydrocarbon resins and mixtures thereof; from 15 to 600 parts by weight of plasticizer selected from the group consisting of polybutenes, low molecular weight polyisobutylenes, phosphate esters, dibutyl phthalate, straight chain aliphatic acid esters, paraffine oils, coal tars, asphalts, chlorinated polyphenyl, chlorinated biphenyl and mixtures thereof; from about 0.5 to 60 parts by weight of adhesion promoter comprising an epoxy resin having an epoxide equivalent of from about 150 to 300; and from about 5 to 1,000 parts by weight of inert filler material, said composition being readily extrudable at temperatures above about 150°F. while hardening upon cooling without undergoing chemical change, and having a hardness of about 5 to 95 on a Shore A Durometer at room temperature.

2. A hot melt composition as defined in claim 1 wherein the adhesion promoter includes an organic silane.

3. A hot melt composition as defined in claim 1 having approximately the following composition in parts by weight:

| | |
| --- | --- |
| Copolymer of Isobutylene and Isoprene | 10 |
| Polyterpene resin | 90 |
| Polybutene | 45 |
| Epoxy resin | 20 |
| Filler | 40. |

4. A hot melt composition as defined in claim 1 having approximately the following composition in parts by weight:

| | |
| --- | --- |
| Copolymer of isobutylene and isoprene | 100 |
| Phenolic resin | 25 |
| Epoxy resin | 30 |
| Stearic acid | 2 |
| Filler | 187 |
| Polybutene | 150. |

5. A hot melt composition as defined in claim 1 having approximately the following composition in parts by weight:

| | |
| --- | --- |
| Copolymer of isobutylene and isoprene | 50 |
| Polyterpene resin | 50 |
| Filler | 40 |
| Epoxy resin | 10 |
| Organic silane | 1 |
| Stearic Acid | 1 |
| Polybutene | 25. |

* * * * *